United States Patent
Turina et al.

(10) Patent No.: US 7,164,693 B2
(45) Date of Patent: *Jan. 16, 2007

(54) SIGNALING TRANSPORT PROTOCOL EXTENSIONS FOR LOAD BALANCING AND SERVER POOL SUPPORT

(75) Inventors: Klaus Turina, Backnang (DE); Josephus Kuster, Prosper, TX (US); Dimitris Papadimitriou, Marousi (GR); Hans-Peter Lippelt, Neuss (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 947 days.

This patent is subject to a terminal disclaimer.

(21) Appl. No.: 10/023,599

(22) Filed: Dec. 17, 2001

(65) Prior Publication Data

US 2002/0093981 A1    Jul. 18, 2002

Related U.S. Application Data

(63) Continuation-in-part of application No. 09/740,175, filed on Dec. 18, 2000, now Pat. No. 6,826,198.

(51) Int. Cl.
*H04J 3/22* (2006.01)
(52) U.S. Cl. .......................... 370/467; 370/469
(58) Field of Classification Search ................ 370/401, 370/465, 466, 467, 496, 522
See application file for complete search history.

(56) References Cited

U.S. PATENT DOCUMENTS 6,501,755 B1 * 12/2002 McAllister et al. ......... 370/392
6,718,419 B1 * 4/2004 Delvaux ..................... 710/305
6,816,479 B1 * 11/2004 Euget et al. ................ 370/351
6,826,198 B1 * 11/2004 Turina et al. ............... 370/467
2002/0044558 A1 * 4/2002 Gobbi et al. ........... 370/395.52

FOREIGN PATENT DOCUMENTS

| EP | 1 049 307 A1 | 11/2000 |
| WO | WO 99/29124 | 6/1999 |
| WO | WO 00/19758 | 4/2000 |
| WO | WO 00/51395 | 8/2000 |

OTHER PUBLICATIONS

Coene, L. et al., "Signalling Transport over SCTP applicability statement", Internet Draft, Oct. 30, 2000, XP-002220548, pp. 1-37.

(Continued)

*Primary Examiner*—Chi Pham
*Assistant Examiner*—Phuc Tran

(57) ABSTRACT

A communication apparatus running a protocol stack implementation for interworking between a signaling source node and a signaling target node provides improved support for introducing server pools in packet networks and for achieving transparency for applications. A first protocol implementation unit (SCTP) runs a signaling control layer on top of a packet transfer network (IP) for exchanging signaling messages via one or more signaling associations. A second protocol implementation unit (SUA, M3UA) runs a user adaptation layer on top of the signaling control layer SCTP for supporting signaling connection control services (RANAP) used by the signaling source node. A name mapping unit receives a signaling target node name from the signaling source node and maps the name into a peer signaling association.

61 Claims, 12 Drawing Sheets

OTHER PUBLICATIONS

Stewart, R et al., "Stream Control Transmission Protocol", Network Working Group, Oct. 31, 2000, XP-002220549, pp. 1-134.

Form ISA/210 International Search Report for PCT/EP01/14952 (4 pgs.).

Stewart, R.R. et al., "Data Distribution Protocol (DDP)", Network Working Group, Internet Draft, <draft-xie-stewart-sigtran-ddp-01.txt> Apr. 12, 2000.

Loughney, J. et al., "SS7 SCCP-User Adaptation Layer (SUA)", Internet Draft, Internet Engineering Task Force, <draft-ietf-sigtran-sua-01.txt>, Jul. 2, 2000.

Stewart, R.R. et al., "Stream Control Transmission Protocol", Network Working Group, Internet-Draft, <draft-ietf-sigtran-sctp-13.txt>, Jul. 11, 2000.

Ong, L. et al., "Framework Architecture for Signaling Transport", Network Working Group, Request for Comments: 2719, Category: Informational, Oct. 1999.

* cited by examiner

SIGNALING TRANSPORT PROTOCOL EXTENSIONS FOR LOAD BALANCING AND SERVER POOL SUPPORT

This application is a Continuation-In-Part of prior application Ser. No. 09/740,175 filed on Dec. 18, 2000, now U.S. Pat. No. 6,826,198.

FIELD OF INVENTION

The present invention relates to signaling transport protocol extensions for load balancing and server pool support, and in particular to the provision of a name translation mechanism within such a signaling transport protocol.

BACKGROUND OF INVENTION

FIG. 1 shows a signaling transport protocol sack as defined by the Internet Engineering Task Force IETF for the provision of standard signaling connection control part SCCP services and standard message transfer part layer 3 MTP3 services.

As shown in FIG. 1, on top of the Internet protocol IP there runs a stream control transmission protocol SCTP. The stream control transmission protocol SCTP has been developed to improve the quality of service capabilities which are particularly required for real time communication applications.

As also shown in FIG. 1, on top of the stream control transmission protocol SCTP runs, e.g., the signaling connection control part SCCP user adaptation layer SUA and/or the MTP3 user adaptation layer M3UA according to the SIGTRAN protocol stacks defined by the Internet Engineering Task Force IETF. All these protocols and related implementations are commonly known in the art and therefore will not be explained in detail.

The SIGTRAN protocol stack shown in FIG. 1 is used to transport signaling messages using the common channel signaling system No. 7—also referred to as CCS No. 7 in the following—over the IP network. Typically, mobile cellular communication networks rely to a very large extent on signaling connection control part SCCP services. Specific examples are the radio access network application part RANAP for third generation cellular mobile communication networks and the base station system application part BSSAP for second generation cellular mobile communication networks. Yet another example for an SCCP service is the transaction capability application part TCAP used by the mobile application part MAP, the intelligent network application part INAP, and the customized application mobile for enhanced logic CAMEL.

When migrating the common channel signaling system services to an Internet protocol IP backbone infrastructure, all these protocols must be supported via SUA/SCTP/IP or SCCP/M3UA/SCTP/IP. However, the migration of CCS7 SCCP services to an IP backbone infrastructure leads to problems since these services and their addressing mechanisms originate from a circuit switched environment. I.e., the SCCP services use either a destination point code DPC and subsystem numbers SSN or a global title GT to address specific users. Therefore, both addressing mechanisms point to a single destination in the network which has been the exact requirement for the circuit switched world.

To the contrary, the migration to an Internet protocol IP based backbone network will provide new possibilities to enhance service provisioning. Recently, server pools have been proposed to increase service availability and capacity in future mobile cellular communication networks. Server pools are seen from the outside as a single logical entity. A user requesting a service from such a server pool does not consider which actual physical server is going to handle his request.

However, while from the viewpoint of network, e.g., characteristics it may be desirable to have an equal load balancing over all servers comprised in the server pool, existing addressing mechanisms do not support such a load balancing between different servers in a server pool.

A possible solution using available technologies is to go up to the SCCP protocol level and to carry out the selection on this user layer. Then the request for the handling of a service by a specific server in a server pool must be retransmitted to the selected server. This solution causes an additional data exchange overhead and service provision delay during service execution and consumes additional processing capacity.

SUMMARY OF INVENTION

In view of the above, an object of the present invention is to achieve an improved support for the introduction of server pools in packet based networks and to achieve transparency for applications.

A further object of the present invention is to achieve simplified operation and maintenance for such packet based networks with server pools.

According to the present invention this object is achieved by a communication apparatus running a protocol stack implementation for interworking between a signaling source node and a signaling target node, comprising a first protocol implementation unit adapted to run a signaling control layer of the protocol stack or top of a packet transfer network for exchange of signaling data via at least one destination, a second protocol implementation unit adapted to run a user adaptation layer of the protocol stack on top of the signaling control layer for support of signaling connection control services used by the signaling source node, wherein a name mapping unit is adapted to receive a signaling target node name from the signaling source node and to map the signaling target node name into a destination. Without restricting scope of the present invention the destination of a signaling message exchange may either be a peer signaling association or a transport address.

Therefore, with respect to the mapping of the signaling target node name into a peer signaling association as destination the present invention allows to support server pooling and leads to increased system fault tolerance due to the provision of server pools. Additional benefits are dynamic system scalability, i.e. the ability for adding and removal of servers without reconfiguration of remaining servers.

In addition, the name translation of a target node name into a peer signaling association supports association handling, i.e. multiple interactions between a client user and a destination server in a server pool having a signaling target name or equivalently a server pool name. Also, the present invention allows for the use of name mapping related data and services in a distributed manner across an operational scope of the packet transfer network, e.g., the Internet protocol IP network. The name mapping unit itself may in this case be implemented, e.g., as agent in different network nodes.

As server pools are usually addressed on a name basis and the related addresses are then resolved within the inventive name transition mechanism, new servers may register in server pools in an automatic manner leading to a significant decrease of operation administration and maintenance costs since new server addresses must not be administered manually in every node of the Internet protocol IP network.

Further, with respect to the mapping of the signaling target node name into a transport address as destination for use in the packet transfer network it is possible to eliminate addressing mechanisms used for the transport of signaling messages in circuit switched networks. Advantageously, only packet based address mechanisms have to be administered and the need for simultaneous support of circuit and packet switched addressing mechanisms vanishes. Here, any type of packet switched addressing is well within the scope of the present invention, e.g., IP addressing, addressing according to Frame Relay, ATM, STM, etc.. This leads to much lower administrative costs and an easier maintenance of the network.

Further, irrespective of the type of name mapping used, the present invention achieves real time name translation, e.g., through provision of local copies of data relating to name mapping in each network node and/or host.

Yet another important benefit of the present invention is that upper layer protocols like SCCP and/or MTP3 must not decide on load balancing. This functionality is encapsulated in the name translation mechanism provided for the user adaptation layer and thus may be changed and renegotiated during operation—e.g., depending on time—without affecting the upper user layer. This leads to a better load balancing within the server pool.

Further, due to the encapsulation of the name translation mechanism in she lower user adaptation layer of the protocol stack—e.g., the SIGTRAN stack—the inventive solution is applicable to all user adaptation layer users.

Still further, the present invention is well adapted to any type of user adaptation layer, e.g., SCCP user adaptation layer SUA, the message transfer part layer 3 MTP3 user adaptation layer, the ISDN user adaptation layer IUA, the V5.2 user adaptation layer, etc.

According to a preferred embodiment of the present invention he name mapping unit of the communication apparatus comprises a mapping data interface unit adapted to distribute and/or receive signaling destination attributes via the signaling control layer, e.g., SCTP.

This preferred embodiment of the invention allows for a name translation interworking between a plurality of communication apparatuses in the network to increase fault tolerance.

According to yet another preferred embodiment of the present invention the name mapping unit also comprises a memory unit adapted to store signaling destination attributes—used in the context of addressing of signaling messages—locally in the communication apparatus.

According to this preferred embodiment of the present invention mapping related data is updated only in a single data base and may then be distributed in the packet transfer network, e.g., the Internet protocol IP network, via local copies of the mapping related data. A periodic update of name space and/or attribute data in a data base improves data consistency. Further, this feature supports real time name mapping through avoidance of messaging for name space and/or attributed data.

According to yet another preferred embodiment of the present invention the target node name resolution unit is adapted to map a server pool name into the destination—e.g., peer signaling association or transport address—according to a specified algorithm. Examples for such algorithms are query response data base mechanism such as ENRP/DDP. Yet another alternative is a table lookup technique.

This preferred embodiment of the present invention increases flexibility through a specification of a name mapping mechanism. In conclusion, the mapping acts as generic interface capable of interworking with different name spaces.

According to yet another preferred embodiment of the present invention the target node name resolution unit is of a client/server type responding to name translation requests from signaling source node clients in a local and/or remote manner.

The client/server architecture increases fault tolerance of the target node name resolution unit. Further, it enables backup server selection or, equivalently, the implementation of a server hunting and takeover procedure. Overall, load balancing for a plurality of name mapping processes in the packet transport network, e.g., the Internet protocol IP network may be improved.

According to yet another preferred embodiment of the present invention the target node name resolution unit is further adapted to consider at least one criterion selected from a group comprising target node capability, target node load and routing criteria association attributes to map the signaling target node name into the peer signaling association.

This preferred embodiment of the present invention achieves optimal name mapping in view of criteria that may change over time.

According to yet another preferred embodiment of the present invention the name mapping unit further comprises a fault management unit adapted to detect an inoperative destination—e.g., peer signaling association and/or an inoperative signaling transport address in a peer signaling association or also an inoperative transport address—and to select another destination under the sane signaling target node name.

This preferred embodiment of the present invention is of particular advantage during an Internet protocol IP network failure detection and a subsequent automatic recovery. In other words, the name translation service may survive, e.g., in isolated communication islands.

Also, this feature enables improved mapping data consistency and supports failure mechanisms between different instances, e.g., servers comprised in a server pool.

Further, this preferred embodiment of the present invention may be used to support maintenance operations in the network.

Similar advantages as outlined above with respect to the communication apparatus are also achieved with the inventive method of running a protocol stack implementation for interworking between a signaling source node and a signaling target node and the method of exchanging signaling messages between a signaling source node and a signaling target node using a name based addressing scheme.

Still further, the present invention is also provided to achieve an implementation of the inventive method steps on computer or processor systems. In conclusion, such implementation leads to the provision of computer program products for use within a computer system.

The programs defining the functions of the present invention can be delivered to a computer/processor in many forms, including, but not limited to information permanently stored on a non-writable storage medium, e.g., read only memory devices such as ROM or CDROM discs readable by processors or computer I/O attachments; information stored on writable storage media, e.g., floppy discs and harddrives: or information conveyed to a computer/processor through communication media such as a network and/or telephone network and/or Internet or any other suitable interface devices. It should be understood that media when carrying processor readable instructions implement the inventive concept to represent alternate embodiments of the present invention.

BRIEF DESCRIPTION OF DRAWING

In the following, the best mode of carrying out the invention as well as further advantages, objects and preferred embodiments thereof will be described with reference to the drawing in which.

BEST MODE OF CARRYING OUT THE INVENTION

Figure 1:
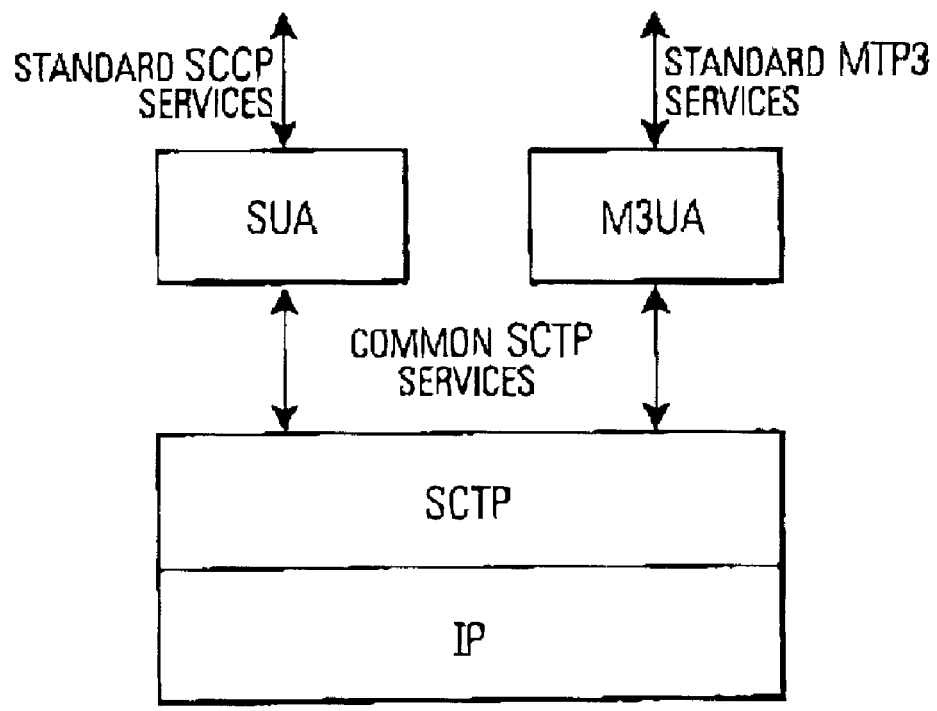
FIG. 1 shows a signaling transport SIGTRAN protocol stack.

In the following, the best mode of carrying out the present invention as well as preferred embodiments thereof, further objects and further advantages will be explained with respect to the drawing. Insofar as different features of the present invention are explained with respect to certain aspects thereof, it is to be understood that these features are combinable with each other to achieve various other modifications and variations of the present invention.

Figure 2:
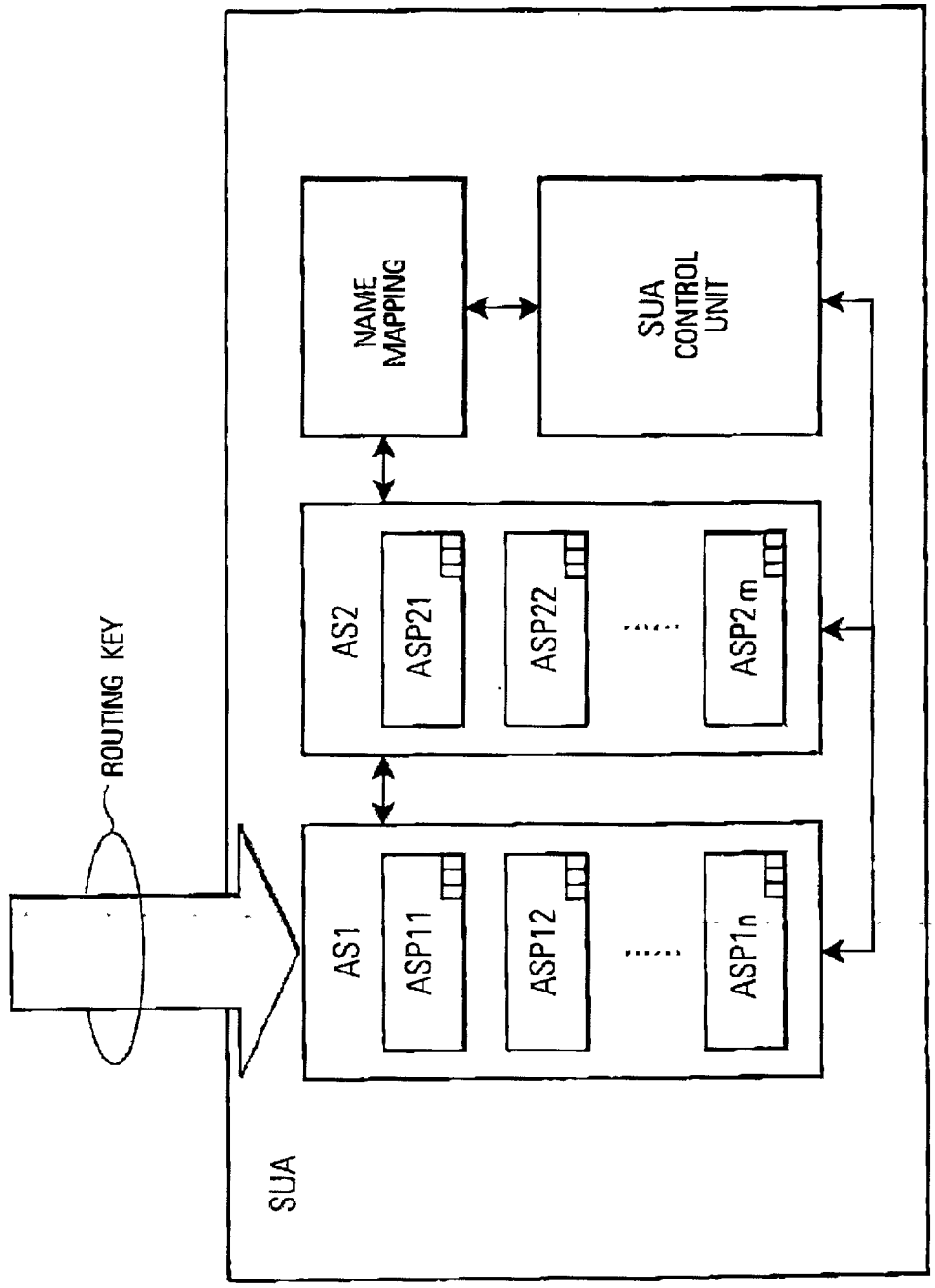
FIG. 2 shows a schematic diagram of the signaling connection control part SCCP user adaptation layer SUA comprising a name mapping according to the present invention.

FIG. 2 shows a schematic diagram of the signaling connection control part SCCP user adaptation layer SUA according to the present invention. While in the following, reference will be made to this signaling connection control part SCCP user adaptation layer SUA, it should be noted that this explanation is clearly non-restrictive for the present invention and that any type of user adaptation layer is covered by the present invention, e.g., the MTP3 user adaptation layer M3UA according to SIGTRAN protocol stacks or ISDN user adaptation layer IUA. Insofar, as the following description of preferred embodiment refers to the signaling connection control part SCCP user adaptation layer SUA, it should be understood that all these explanations are equivalently applicable to any other user adaptation layer. In addition, the same explanations as well apply to the application of a transport address—e.g., without restricting scope of the invention and IP address—as identification of a signaling target node.

As shown in FIG. 2, the signaling connection control part SCCP user adaptation layer SUA divides in a plurality of application servers AS1, AS2. Each application server is a logical entity serving a range of signaling traffic configured therefore. An example of an application server is a virtual switch element handling all call processing for a unique set of SCCP users. As shown in FIG. 2, the application server contains a set of one or more application server processes of which one or mare application server process is actively processing traffic. The application server processes use a so-called SCTP association shown in the form of multiple small rectangles and explained in more detail with respect to FIG. 3 and 4 in the following. In more detail, each application process ASP11, ASP12, . . . ASP2m serves as an active or standby process of an application server AS1, AS2, e.g., as part of a distributed signaling node or data base element. An application server process ASPij (i=1, 2, j=1 . . . n or m) uses an SCCP end point and may be configured to process traffic within more than one application server AS1, AS2 (not shown in FIG. 2).

As also shown in FIG. 2, different application servers AS1, AS2 and application server processes ASP11, ASP12, . . . ASP2m are coordinated by a SUA control unit. Further, the SCCP user adaptation layer SUA according to the present invention comprises a name mapping unit receiving a host name from either application server AS1, AS2 in the user adaptation layer SUA for submission to a name translation service implemented in the name mapping unit. The name mapping unit returns information that is required by the user adaptation layer SUA to select one dedicated SCTP association (explained in more detail in the following) towards the requested destination. The return information contains a list of nodes that are related to the host name received by the name mapping unit.

According to the present invention, it is also proposed to achieve name translation in view of, e.g., the load status of the nodes belonging to the submitted host name and a preferred load sharing algorithm. Based on the information generated by the name mapping unit the user adaptation layer SUA can then decide to which application server process the requested service adaptation layer SUA service should be sent and which SCTP association should be used.

Therefore, according to the present invention it is proposed to modify the service adaptation layer SUA user—e.g., BSSAP or RANAP—in a way to use host name based addressing initiating a new signaling transaction. In the user adaptation layer SUA a translation of the host name is implemented in the name mapping unit. However, it is to be noted that this translation may also be implemented externally from the user adaptation layer SUA as long as a mechanism for exchange of host name and related generated addressing information is provided.

The final result or the name translation is a so-called stream control transmission protocol SCTP association identifier that will be used by the user adaptation layer SUA towards the stream control transmission protocol SCTP. Further, the user adaptation layer SUA implementation stores this SCTP association identifier as belonging to a specific dialogue identified by routing keys uniquely defining a range of signaling traffic to be handled by a particular application server for follow-on messages that belong to this dialogue.

Figure 3:
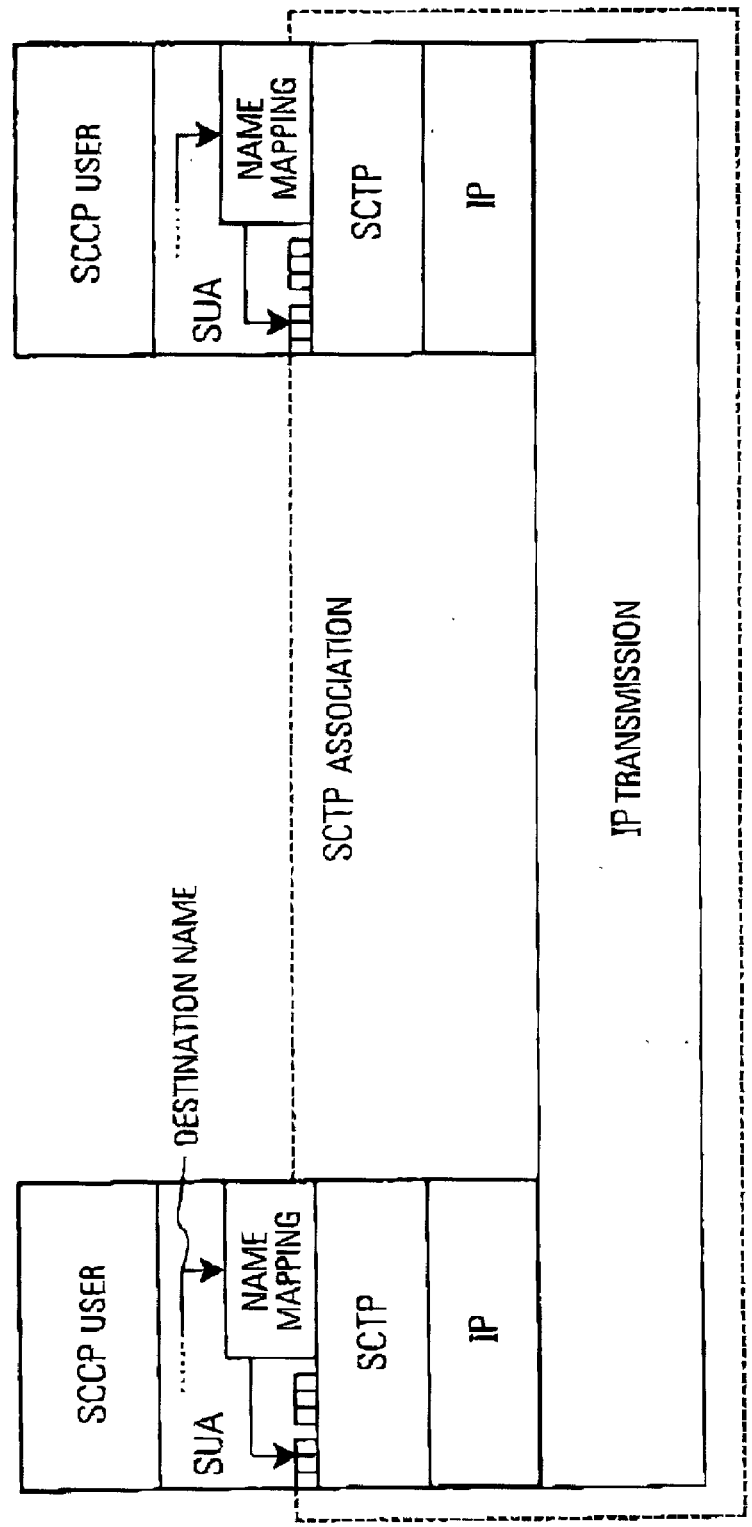
FIG. 3 shows the use of stream control transmission protocol SCTP associations for the exchange of signaling connection control part SCCP messages and a related name mapping mechanism according to the present invention.

FIG. 3 shows further details of a stream control transmission protocol SCTP association for the exchange of signaling connection control part SCCP messages and the relation thereof to the name making mechanism according to the present invention.

As shown in FIG. 3, the user adaptation layer SUA protocol is used for the transport of any SS7 SCCP user signaling (TCAP, RANAP, BSSAP, . . . ) over IP using the SCTP protocol. It terminates signaling control network SCN signaling and transports SCTP user signaling over IP to an IP signaling end point. Heretofore, a signaling gateway is modeled with at least one application server, which is located, e.g., at the border of SS7 and IP networks. The stream control transmission protocol SCTP protocol layer provides a number of functions such as SCTP association set-up and shut-down, sequence delivery of data streams, data fragmentation, data acknowledgement, congestion avoidance, packet validation and path management.

As also shown in FIG. 3, the stream control transmission protocol SCTP layer supports a SCTP association between SCTP endpoints. Each SCTP endpoint has a list of transport addresses assigned thereto—e.g., multiple IP addresses—to receive or originate SCTP user protocol data packets. An SCTP association spans transfers over all the possible source address/destination address combinations that may be generated between two SCTP endpoints in view of the related list of transport addresses illustrated as subdivided rectangles in FIG. 3. An SCTP association is initiated on request of the signaling endpoint and maintained permanently and allows to link two SCTP endpoints via multiple routes. Such a link of two SCTP endpoints supports an SCTP signaling stream as non-permanent signaling data exchange via an SCTP association for control processes.

In the following, a peer signaling association is referred to as a set of transport addresses pointing to a group of network destination communication/signaling endpoints registered under the same target name used by SCTP users.

Figure 4:
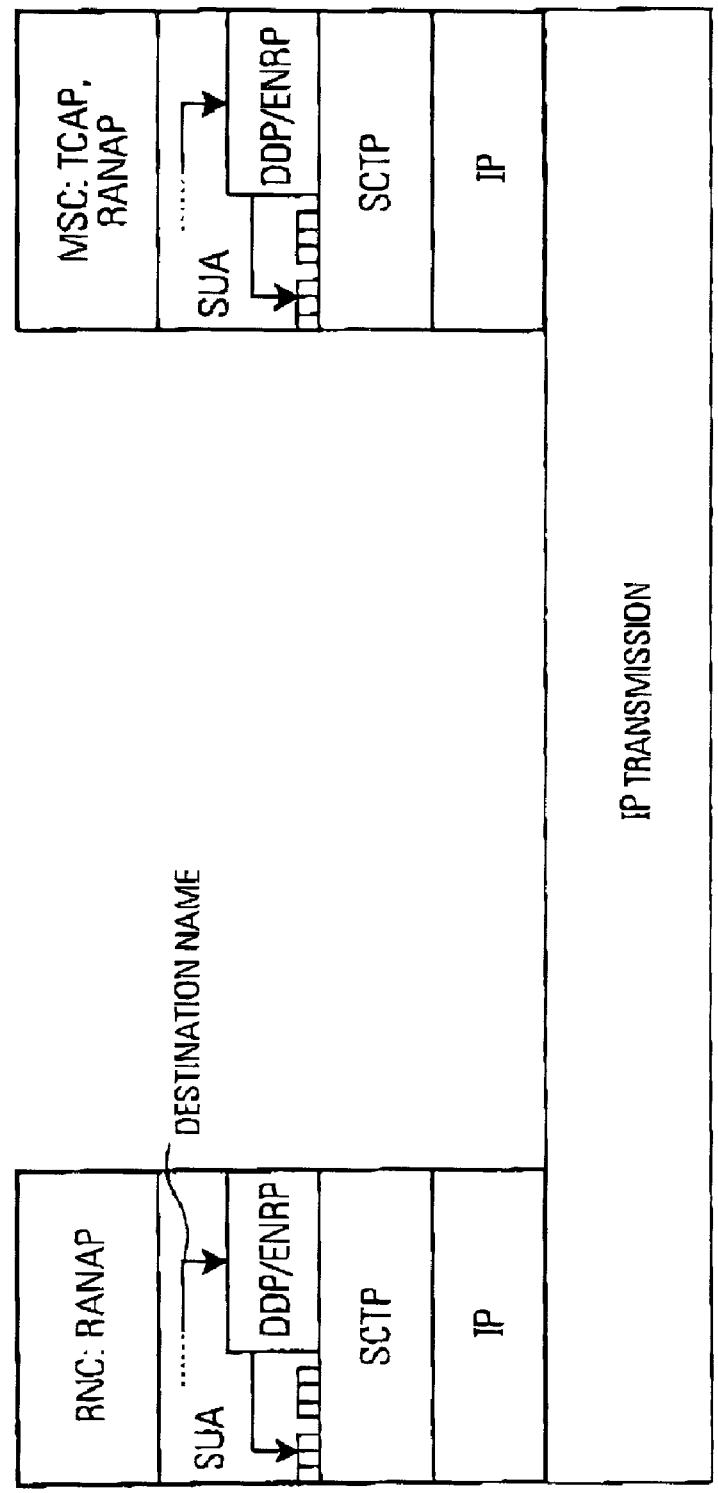
FIG. 4 shows the use of a data distribution protocol DDP and the end point name resolution part ENRP for name translation within the SCCP user adaptation layer SUA according to the present invention.

FIG. 4 shows the use of the data distribution protocol DDP and the endpoint name resolution part ENRP for name translation within the SCCP user adaptation layer SUA according to the present invention.

The data distribution protocol DDP shown in FIG. 4 achieves operatively a name based addressing mechanism which isolates a logical communication endpoint from its IP addresses. This effectively eliminates the binding between the communication endpoint and its physical IP addresses.

Further, DDP defines each logical communication destination as a named group, thus achieving full transparence support for server pooling and load sharing. It allows dynamic scalability in that members of a server pool may be added or removed at any time without server interrupt.

Each DDP endpoint uses an ENRP unit to obtain name translation and other related services. Here, the ENRP unit may be implemented as a server program running on a node that manages the name space collectively and replies to service requests from any ENRP client, e.g., the DDP unit. It should be noted that the DDP/ENRP mechanism receiving a destination name from a SUA user—e.g., RNC:RANAP for third generation cellular mobile communication networks—is to be considered as only one example for implementing the general inventive concepts outlined and explained in more detail in the following.

Figure 5:
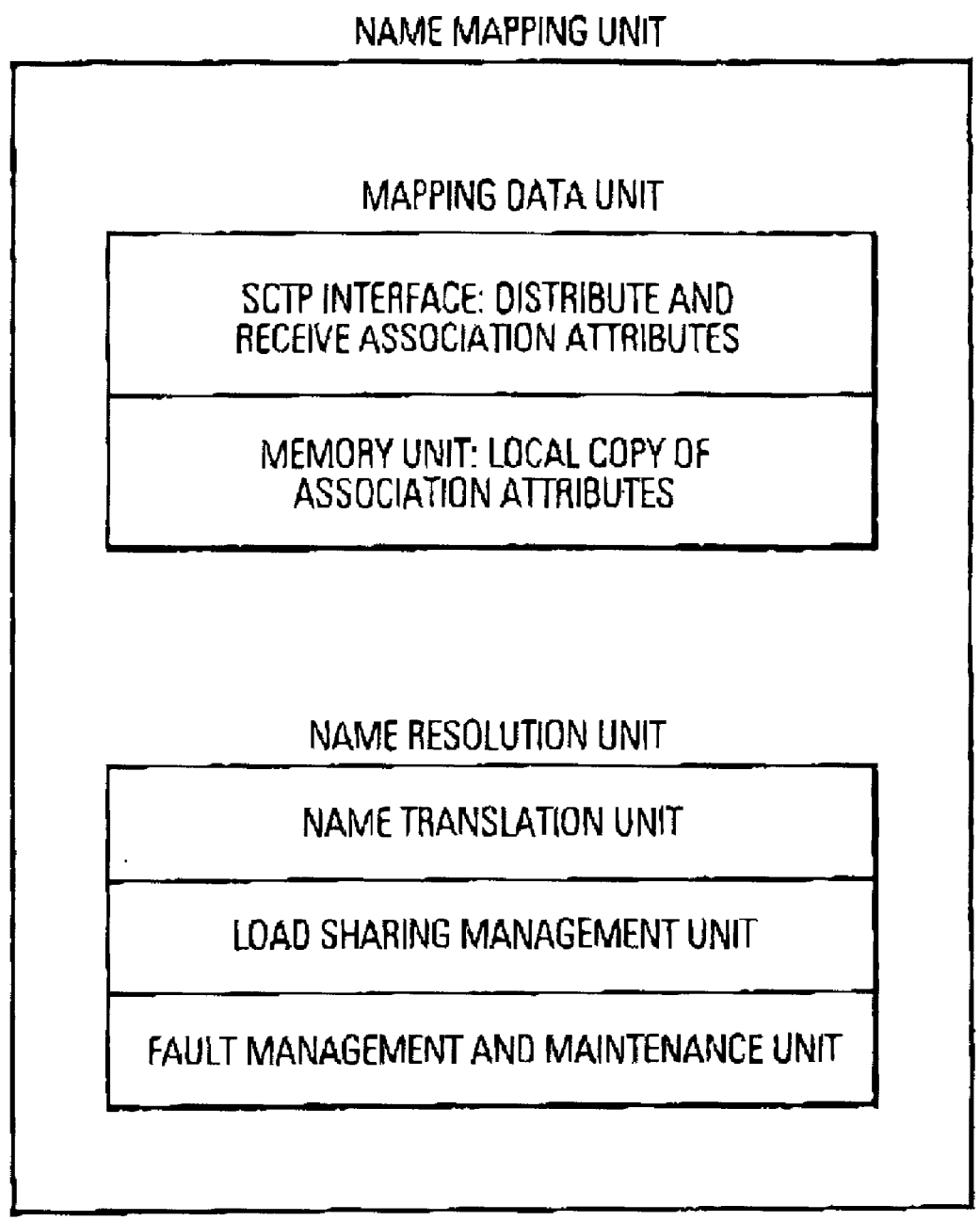
FIG. 5 shows a schematic diagram of the name mapping unit according to the present invention.

Heretofore, FIG. 5 shows a schematic diagram of the name mapping unit interworking with the user adaptation layer SUA.

As shown in FIG. 5, the name mapping unit divides into a mapping data unit and a name resolution unit. Operatively, the mapping data unit is provided to maintain and support data which is necessary for the name mapping according to the present invention. Heretofore, an SCTP interface distributes and receives association attributes and a memory unit maintains local copies of association attributes. It should be noted that the storage of such association attributes is not restricted to a local copy but may be as well achieved at a remote node in the Internet protocol IP network.

As also shown in FIG. 5, the name rapping unit comprises a name resolution unit with a name translation unit adapted to map a destination name into a peer signaling association according to a specified algorithm. According to the present invention, a target node name may be defined, e.g., through specification of a host name, a process name, and/or an SCTP end point name. Further, the algorithm used for the name translation may be freely specified to increase flexibility. Typical examples for algorithms used for the name translation—which, however, should not restrict the scope of the present invention—are a query response data base algorithm—e.g., according to DDP/ENRP described above—or a table look-up algorithm.

As also shown in FIG. 5, the name resolution unit comprises a load sharing management unit and a fault management and maintenance unit adapted to consider at least one criterion selected from a group comprising target node capability, target node load and routing policy to map the submitted destination name into the destination, e.g., a peer signaling association or a transport address.

Further, the fault management and maintenance unit is adapted to detect an inoperative peer signaling association and/or an inoperative signaling transport address in a peer signaling association to select another signaling transport address under the same destination name to avoid any loss of signaling data. In other words, if a peer signaling association is not available the build-up thereof is triggered. The fault management and maintenance unit may alternatively handle inoperative transport addresses in the same way.

Typical examples for the routing policy—in view of peer signaling associations—supported by the load sharing management unit may be, e.g., round robin, weighted round robin least used, and/or least used with degradation, i.e. increment use value after each use of an IP address. Also a combination of these routing policies lies well within the scope of the present invention.

The name mapping unit shown in FIG. 1 as a single entity may as well be realized using a client/server architecture, where a name resolution server responds to name translation requests submitted from clients to achieve a distributed realization of the inventive concept in an Internet protocol IP network.

Figure 6:
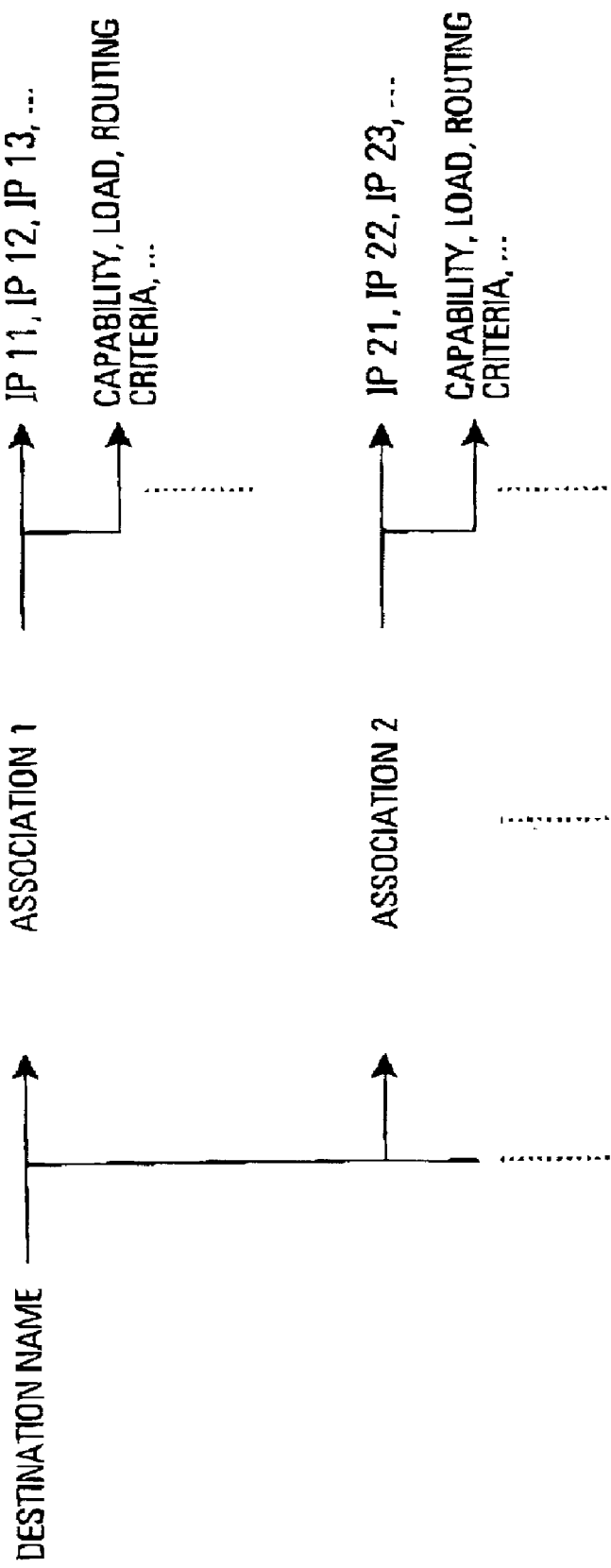
FIG. 6 shows the organization of data necessary for the translation according to the present invention into a suitable data structure, e.g., a tree-structure.

FIG. 6 shows the organization of data—e.g., in the memory unit of the name mapping unit—for an effective implementation of the name translation process.

As shown in FIG. 6, the data for a name translation may be organized into a tree structure where a destination name points to a plurality of SCTP associations. Further, each SCTP association itself points to a plurality of IP addresses that nay be used for signaling message exchange between the signaling SCTP source node and a signaling SCTP target node. Further, each SCTP association may also point to a group of criteria for use within the name translation process, e.g., the service capability being related to the SCTP association, the load of each IP endpoint defined for the SCTP association, routing criteria, etc.

It should be noted that the tree structure may be freely extended without any restriction to incorporate further information supporting the name translation process, e.g., the identification of the server implementing the name translation in case the client/server type realization of name translation is used.

The different principles outlined above with respect to an SCTP association arrangement into a tree structure as well apply to the use of transport addresses as destination. Here, again a tree structure would be built up where the signaling source node designates the designation name or equivalently the signaling target node name. On the first level of the tree there would follow a number of different transport addresses, e.g., Internet addresses, and on the next lower level there would again be specified capability, load, routing criteria, or other criteria. Examples of such criteria might be the day of time, the time as such, when each IP address is activated, the requested service, the signaling source node, or even criteria for surveillance of specific IP addresses. All this shows that the name translation mechanism is freely configurable achieving utmost flexibility within the framework of the present invention.

Figure 7:
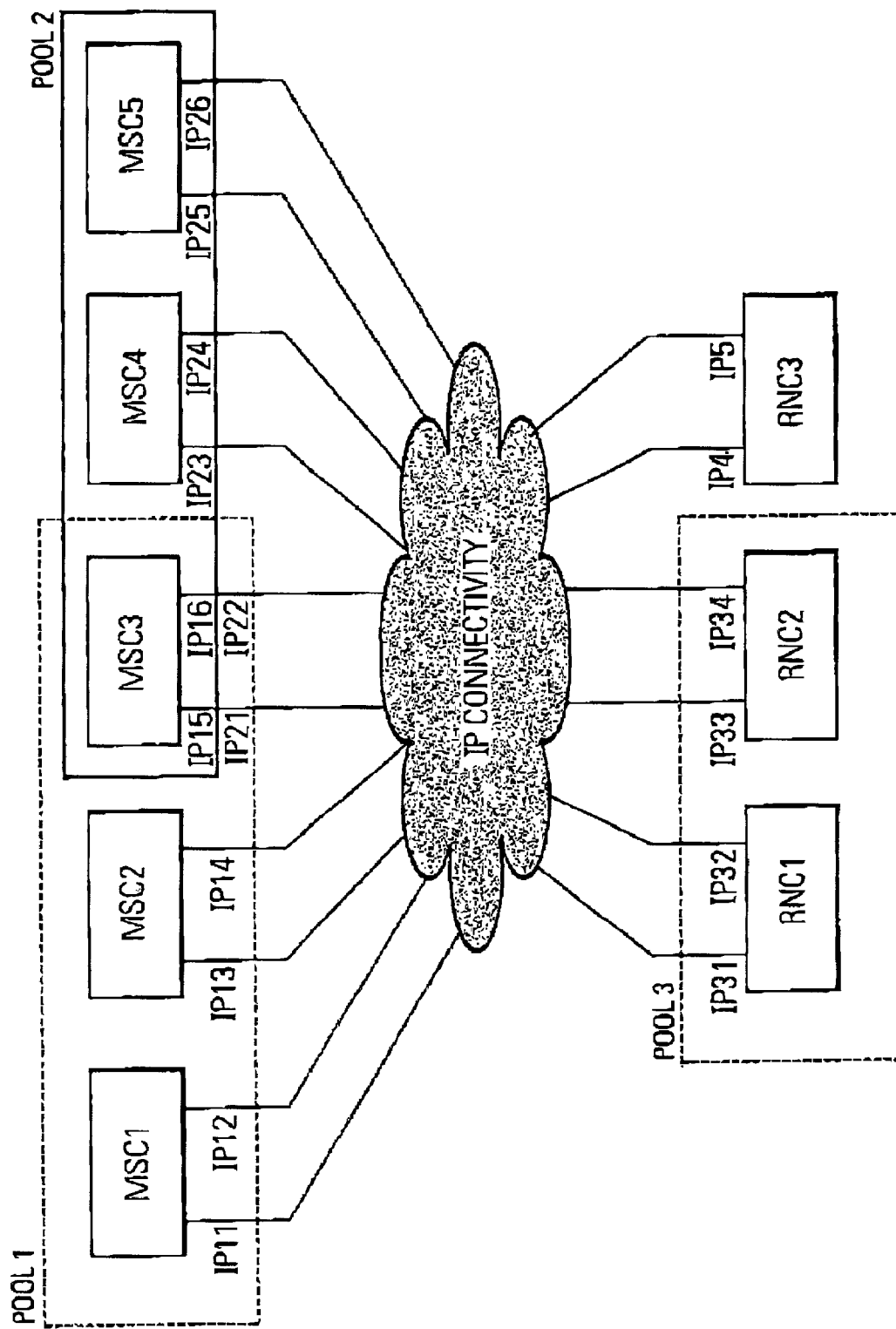
FIG. 7 shows a schematic diagram of a fully Internet protocol IP based load balancing network using the name translation mechanism according to the present invention.

FIG. 7 shows a schematic diagram of a fully Internet protocol IP based load balancing network using the name translation mechanism according to the present invention.

As shown in FIG. 7, the server pool concept being supported by the present invention is applicable, e.g., in a cellular mobile communication network of the third generation. Further, the pooling of servers supports both mobile terminal originating and mobile terminal terminating signaling traffic. Mobile terminal terminating signaling traffic is generated in the pools 1 and 2, while mobile originating signaling traffic is generated via the pool 3. In both cases either network element MSC1, . . . , MSC5 or RNC1, RNC2 may use a signaling target name for the exchange of signaling traffics e.g., pool 1, pool 2, and/or pool 3. If the IP address independent addressing mechanism is used, the name translation mechanism according to the present invention is supported in the area of the Internet protocol IP network as outlined above.

Therefore, the usual protocol stack needs only one modification, i.e. an interface from the user adaptation layer SUA to a name translation service. As outlined above, name translation in the sense of the present invention requires the reception of a host name and the returning of the name and related server addresses and optionally related supplementary information.

Figure 8:
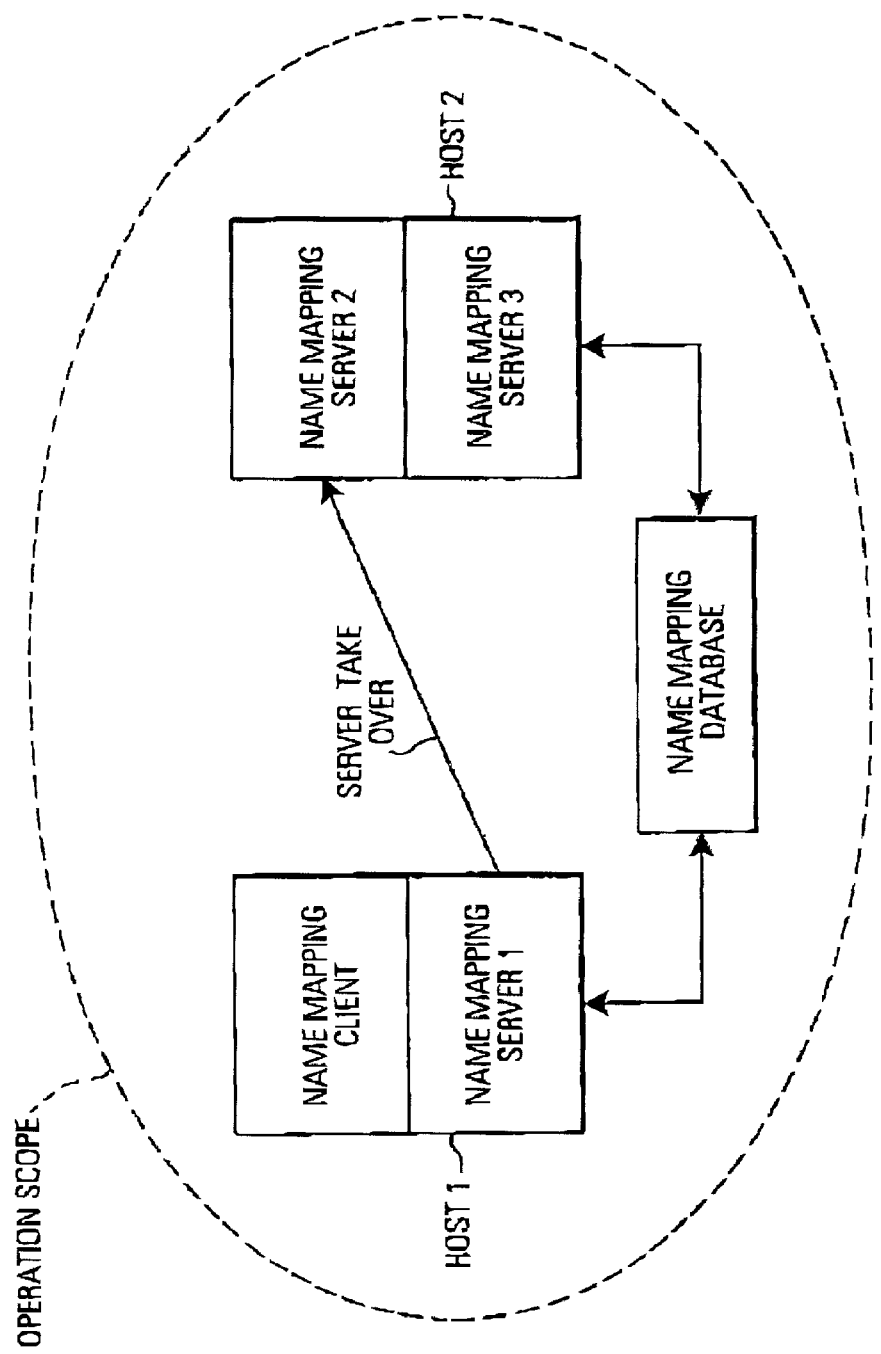
FIG. 8 shows a failure mechanism between different instances supporting name translation according to the present invention.

FIG. 8 shows a failure resolving mechanism between different instances supporting name translation according to the present invention.

As shown in FIG. 8, within an Internet protocol IP network a plurality of name mapping units may be operated as logical entities implementing the name mapping functionality and having the capability to send and receive name translation requests and related translation results.

As also shown in FIG. 8, each such name mapping unit has a certain operation scope being considered as part of the Internet protocol IP network visible by the name mapping unit.

According to the present invention the name translation mechanism is achieved in redundant way. Assuming that a plurality of hosts for the name mapping are provided in the Internet protocol IP network, as soon as one host is inoperative—e.g., due to maintenance operation or failure—the takeover mechanisms are initiated to further prosecute name translation requests at a further host.

While FIG. 8 shows the connection of different hosts to a single name mapping data bases the present invention also covers an embodiment, wherein each host has access to its own dedicated name mapping data base, which is of particular use in case name translation has to be achieved in real time.

Another option for the server takeover could be that specific name translation requests are handled by dedicated hosts in the Internet protocol IP network. In such a case, server hunting for the most suitable host in the Internet protocol IP network would take place for the processing of a submitted request for name translation.

Figure 9:
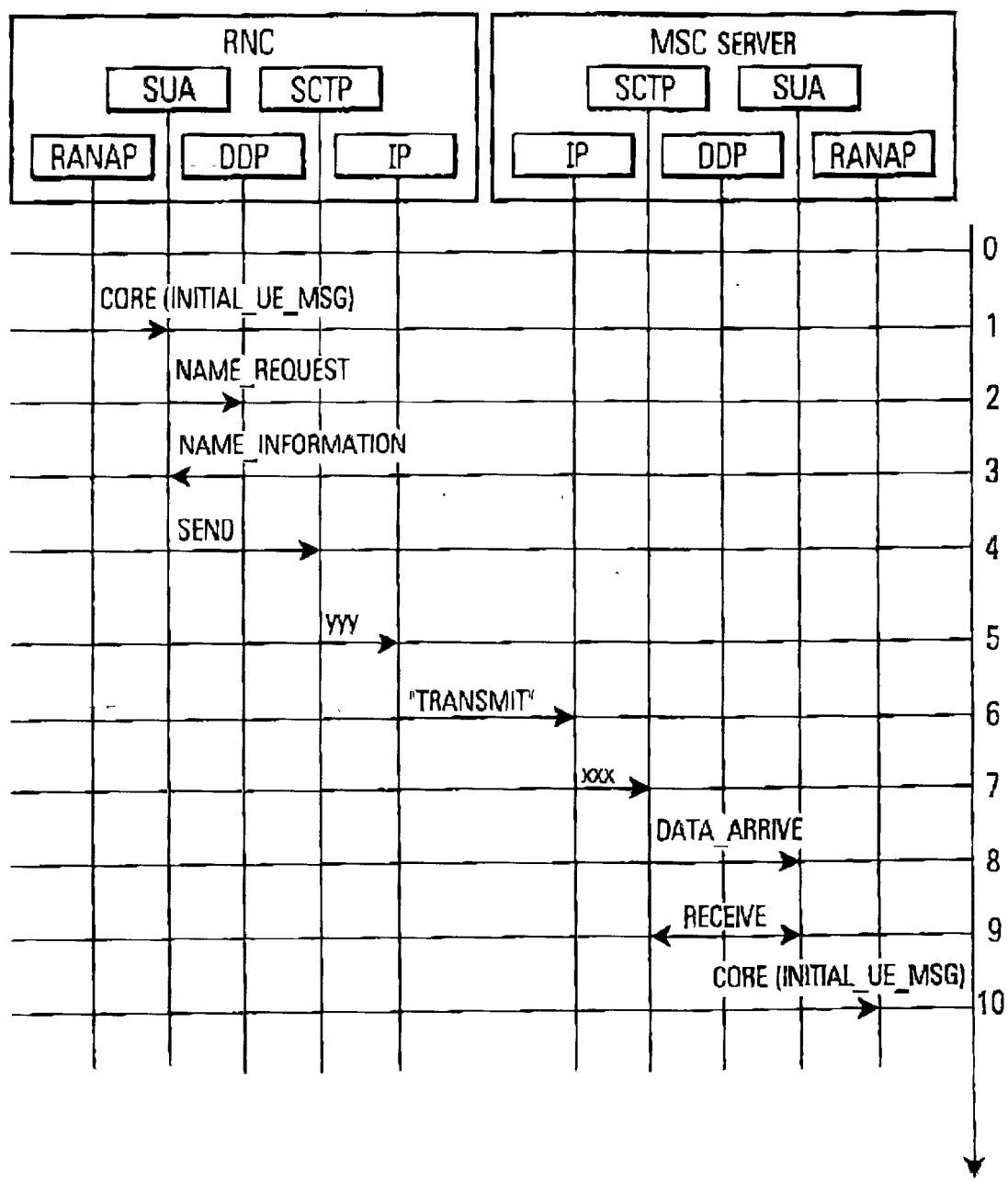
FIG. 9 shows an example for load balancing using the name based addressing mechanism according to the present invention within an extended SIGTRAN protocol stack.

FIG. 9 shows an example for the load balancing using the name based addressing scheme in an extended SIGTRAN protocol stack according to the present invention. Here, it should be noted that this example clearly is not to be construed as limiting the scope of the present invention but is only described as an illustration thereof.

As shown in FIG. 9, signaling occurs between a radio network controller RNC—i.e., a base station for a third generation cellular mobile communication network—and the mobile switching center MSC server. The signaling source node is the radio access network application part RANAP of the radio network controller and the signaling target node is the radio access network application part in the MSC server. As also shown, signaling is supported both in the radio network controller RNC and the mobile switching center MSC server using the SUA/SCTP/IP protocol stack and the data distribution protocol/ENRP service described above.

In the following, the signaling message flow between the signaling source node and the signaling target node will be described as follows:

0. As a prerequisite of the SCTP, associations have to be set up and the DDP/ENRP name translation service has to be initialized. Here, the servers in the different server pools must register with their host name in the name translation service DDP/ENRP.
1. The radio access network application part RANAP will then issue an initial message INITIAL_UE_MESSAGE to start up a new RANAP connection. For this new RANAP connection an SCCP connection oriented service is necessary so that the SCCP primitive CONNECTION_REQUEST (abbreviated as CORE in FIG. 9) is used by the radio access application part RANAP to send the INITIAL_UE_MESSAGE to the core network. Here, the destination is specified, e.g., by the hostname pool 1 shown in FIG. 8. It should be noted that while the introduction of a name based addressing scheme for the user adaptation layer SUA construes an extension to existing standards this extension has not effect on known addressing schemes—e.g., (DPC & SSN, GT)—so that backward compatibility is guaranteed.
2. The user adaptation layer SUA interrogates the name translation service to translate the hostname to an SCTP association, i.e. to real IP addresses. For the example shown in FIG. 9 this is achieved by sending a name request message to the—e.g., local—DDP/ENRP server. The request comprises the hostname parameter received from the radio access network application part RANAP while the DDP/ENRP server uses a set of parameters with respect to this hostname including current load sharing policy, load level, routing values and IP addresses, as outlined above.

3. If the submitted hostname is known in the DDP/ENRP server, it replies with a name information messages containing all SCTP endpoints that are registered under that hostname. In the name information message each SCTP endpoint is identified by IP addressed for the SCTP association and a related routing policy.

4. The user adaptation layer SUA now has all information how to reach the peer signaling association. Therefore, user data is forwarded to the SCTP association using an SCTP sent primitive.

5. The stream control transmission protocol SCTP unit hands the data over to the Internet protocol IP layer.

6. The Internet protocol IF layer forwards the submitted data to the signaling target node.

7. At the signaling target node the received data is handed over to the related stream control transmission protocol SCTP unit.

8. The data arrive primitive informs the MSC SCTP user SUA about the arrival of the new data. It contains the related SCTP association identification together with the message stream identifier.

9. After notification by the stream control transmission part SCTP the user adaptation part SUA uses the received primitive to fetch the new data. It should be noted that no name translation must be performed at the receiving side.

10. The payload INITIAL_UE_MESSAGE is finally forwarded to the application server process, i.e. the radio access network application part RANAP at the signaling target node in the CONNECTION_REQUEST (CORE) message. A CONNECTION_ACKNOWLEDGE message then follows the same SCTP association which is now linked on both the signaling source node side and the signaling target node side.

Figure 10:
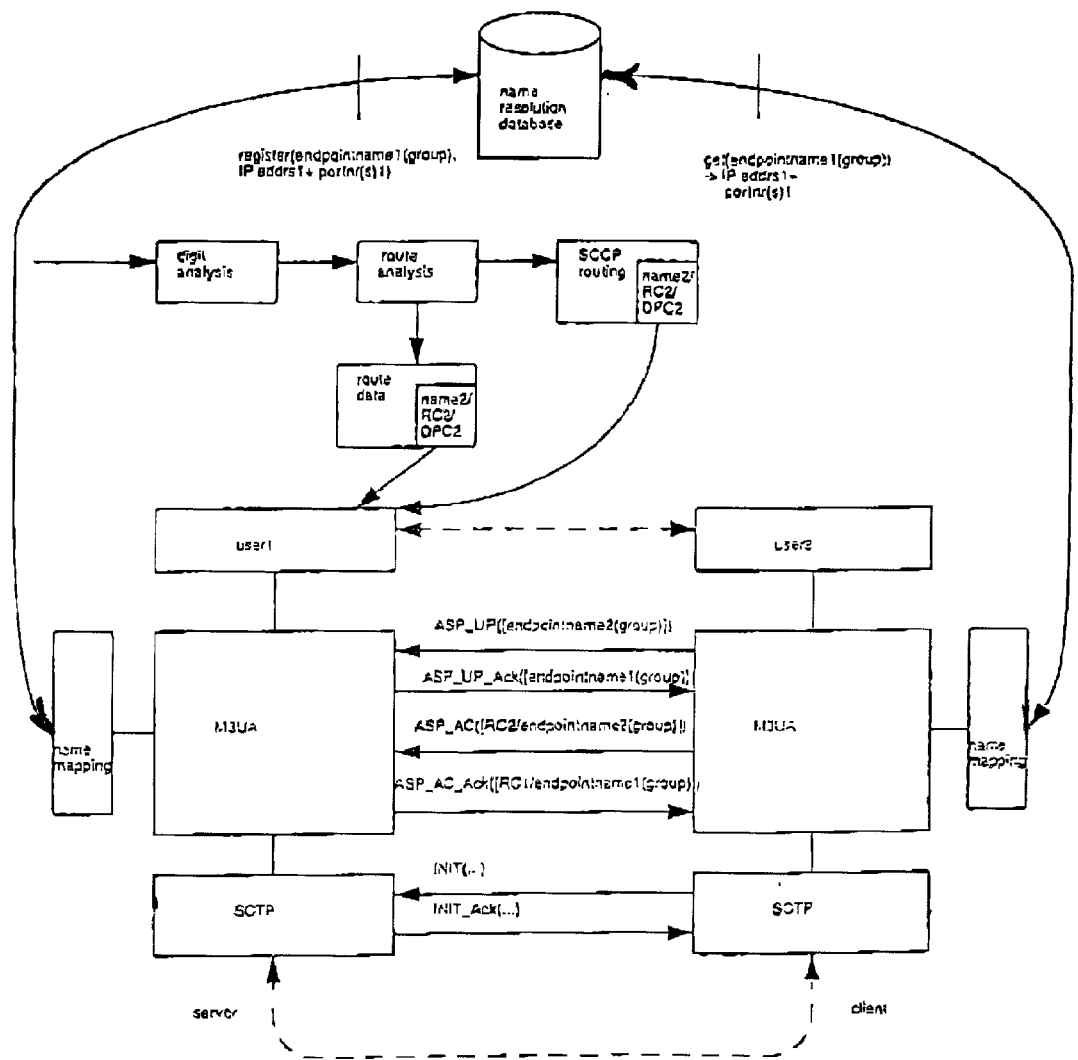
FIG. 10 shows an example for communication via a user adaptation layer according to the present invention.
Figure 11:
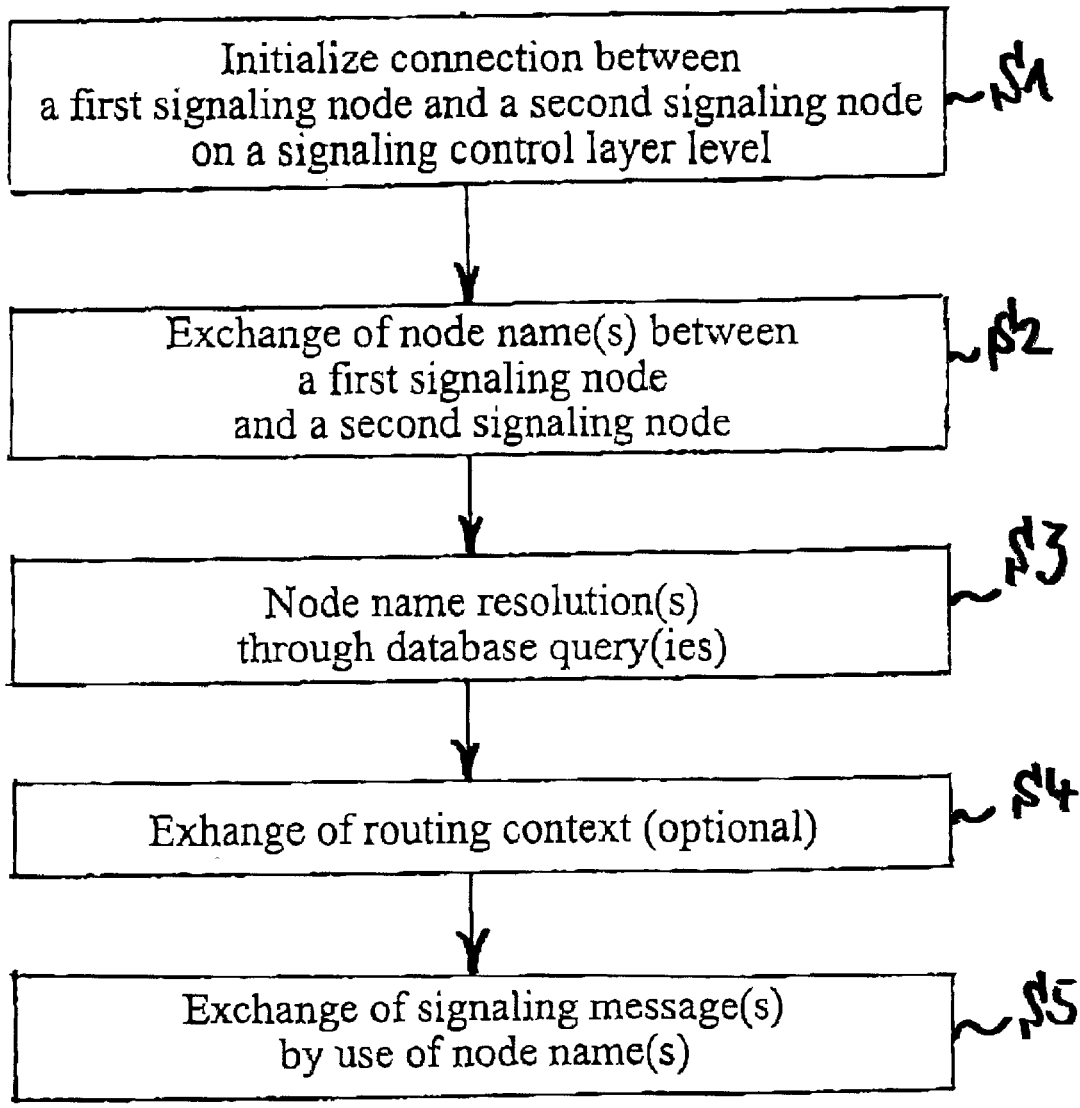
FIG. 11 shows a flowchart for the communication process shown in FIG. 10.

FIGS. 10 and 11 show another example of the application or the name-based addressing scheme to the exchange of signaling information according to the present invention.

In more detail, FIGS. 10 and 11 illustrate a method of exchanging signaling messages between a signaling source node, i.e. the client on a right side in FIG. 10, and a signaling target node, i.e. the server on the left side in FIG. 10. For the particular example shown in FIG. 10 the communication processes rely on the stream control transmission protocol SCTP for initialization of a signaling method. The exchange of signaling messages is achieved using the MTP3 user adaptation layer.

As shown in FIGS. 10 and 11, at the beginning (step S1) there is established an initialization communication link from the client to the server using a predetermined transport address to the server through exchange of an INIT( ) request between the client and the server and a related acknowledgement INIT_Ack( ) back to the client.

The result of this initialization step is an establishment of an association from the client towards the server.

As also shown in FIGS. 10 and 11, after successful establishment of such an association both sides may exchange their related signaling source and target name (step S2) equivalently referred to as endpoint names using the ASP_UP( ) and ASP_UP_Ack( ) statements, respectively. Here, one or more endpoints and their related associations may be assigned to a single group so that the ASP_UP and ASP_UP_Ack( ) statements are as well adapted to the exchange of related group identifications.

As also shown in FIGS. 10 and 11, on the basis of the exchange endpoint names, name mapping (step S3) may then be achieved either only on the server side or the client side, or on both sides by carrying out an access to a name resolution data base. Of course, prior to each such name resolution there is carried out a registration of endpoint names/groups and related IP addresses and port numbers into the name resolution data base for subsequent access thereto.

As also shown in FIGS. 10 and 11, optionally (step S4) there may be exchange routing contact information between the client and the server using the ASP_AC( ) and ASP_AC_Ack( ) instructions, respectively.

Having achieved the establishment of the association towards the server and the related exchange of endpoint names and endpoint name resolution, what follows is the start of signaling traffic between the client and the server (step S5 in FIG. 11). As shown in FIG. 10, hereby the name-based addressing scheme may be used both for call routing and the routing of signaling connection control part SCCP messages.

Further, while not shown in FIG. 10 it is also possible to multiplex a plurality of endpoints onto one SCTP association, so that endpoint names may be used to establish a signaling network on the stream control transmission protocol SCTP and the M3UA layer automatically when signaling source and target nodes are started/restarted.

While according to the example, endpoint names are used to identify application server processes, an alternative would be to use names for host names that may be resolved via a transport address, e.g., an IP address and related port numbers. As already outlined above, it is also possible to define a group of endpoint names or a group of host names.

For the example shown in FIG. 10 the name resolution will not be known by the call processing but is instead handled by the lower layers, as already outlined above, so that the impact on existing call processing is minimal when, e.g., SIGTRAN is used. Specific non-limiting examples of the coupling of the inventive name-based addressing scheme and existing call processing according to the present invention, e.g., according to the signaling system No. 7, are the replacement of the destination point code DPC in route data either by endpoint names or related groups when M3UA is used or by host names or related groups when SCTP is used. This information is given by the user of the related protocol level when a signaling message is to sent for subsequent determination of a SCTP association for exchange of signaling messages. Here, different associations belonging to the same group of endpoints or host names may be used for a load sharing mode or to achieve redundancy.

Yet another alternative according to the present invention as illustrated in FIG. 10 is the exchange of the routing context in M3UA between both sides. Also this information may be used to find an association, i.e. through a matching of the routing contact; this saves processing time in comparison to a routing where information from the MTP3 layer is used.

Figure 12:
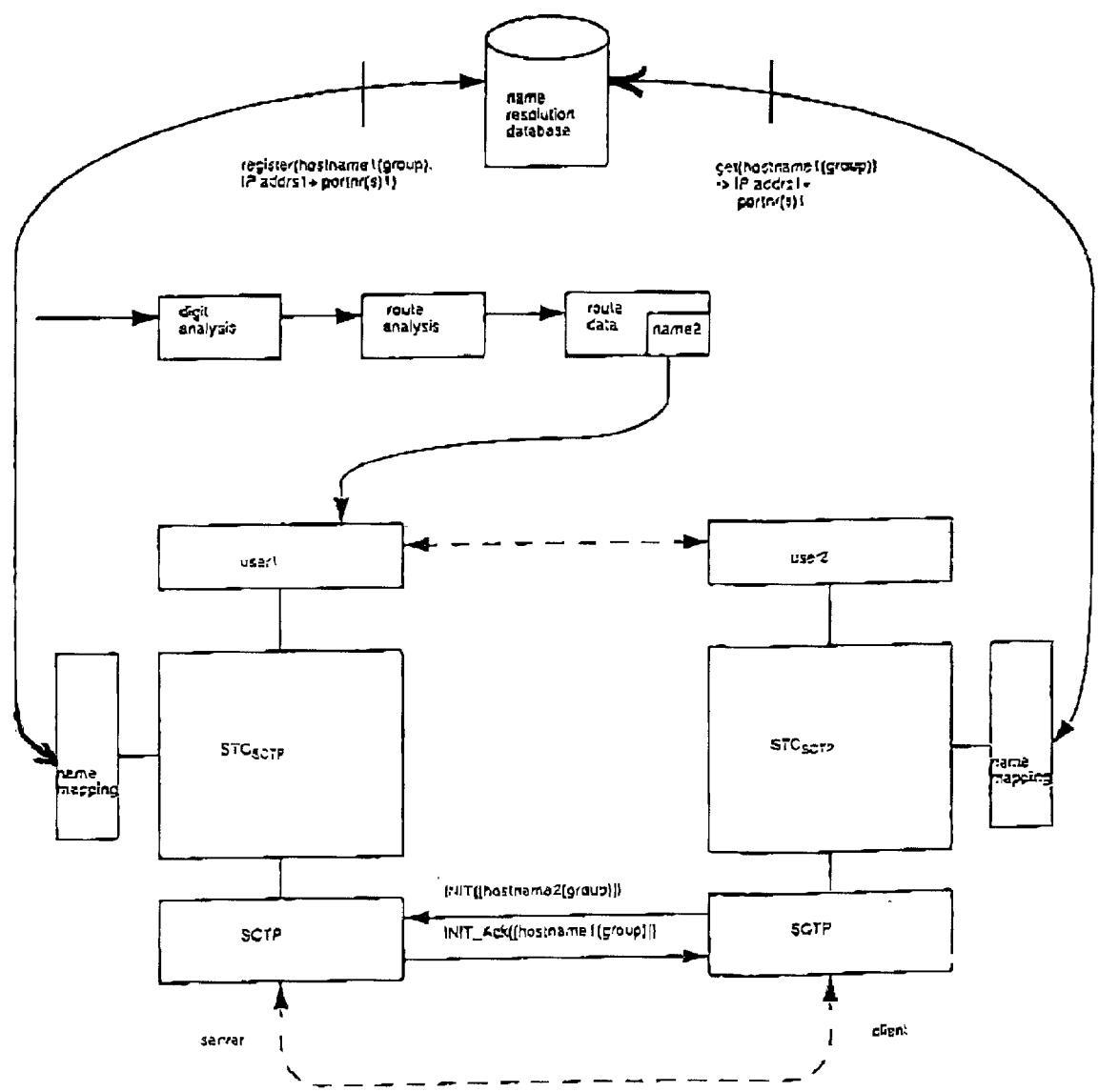
FIG. 12 shows a direct communication via the stream control transmission protocol according to the present invention.

A further example of the application of the inventive name-based addressing mechanism is illustrated in FIG. 12 and relates to an exchange of signaling information between a client and a server on the basis of a direct communication via the stream control transmission protocol.

As shown in FIG. 12, for this communication scenario there is provided a signaling transfer converter $STC_{SCTP}$ between the users and the SCTP layer both at the client and server side.

Similar to the example explained with respect to FIG. 10, care has to be taken that before exchange of signaling information host names—i.e., nodes to which access is achieved via a transport address—or a related group of host names are registered in the name resolution data base. Here, the client sides get the IP addresses and port numbers of the server side through a data base query with host names (or related groups) which it receives via an INIT_Ack( ) command after having submitted its own host name to the server side using an INIT( ) command. According to the example shown in FIG. 12, a host name may be considered as an endpoint name being related to an application server process ASP and a host name group may be considered as name for an application server. As already outlined above, a predetermined target node address is used by the client to set up an initialization communication link before establishing the association to the server.

While in the above, the present invention has been described with reference to the drawing and figures of preferred embodiments of the invention, it should be noted that clearly the present invention may also be implemented using the methods according to the present invention in a digital way using a microprocessor. In this case, the present invention may be embodied as a computer program product directly loadable into she internal memory of the processor comprising software code portions for implementing the inventive concepts outlined above.

Further, it is understood that other modifications will be apparent, too, and can be readily made by those skilled in the art without departing from the scope and spirit or the present invention, e.g., functionalities described above may be realized in software, in hardware, or in combination thereof. Accordingly, it is not intended that the scope of the claims appended hereto is limited to the description as set forth herein, but rather that the claims should be construed so as to encompass all features of patentable novelty that preside in the present invention, including all features that would be treated as equivalent thereof by those skilled in the art to which the present invention pertains.

The invention claimed is:

1. A communication apparatus running a protocol stack implementation for interworking between a signaling source node and a signaling target node, comprising:
    a first protocol implementation unit for running a signaling control layer of the protocol stack on top of a packet transfer network for exchange of signaling data via at least one destination;
    a second protocol implementation unit for running a user adaptation layer of the protocol stack on top of said signaling control layer for support of signaling connection control services used by the signaling source node, wherein the user adaptation layer is selected from a group consisting of:
        a signaling connection control part (SCCP) user adaptation layer (SUA);
        a Message Transfer Part Level 3 (MTP3) user adaptation layer (M3UA) according to Signaling Transport (SIGTRAN) protocol stacks;
        an ISDN user adaptation layer (IUA); and
        a V5.2 user adaptation layer; and
    a name mapping unit for receiving a signaling target node name from said signaling source node and for mapping the signaling target node name into a destination.

2. The communication apparatus of claim 1, wherein said destination is a peer signaling association.

3. The communication apparatus of claim 2, wherein said name mapping unit includes a mapping data interface unit for distributing and/or receiving signaling association attributes via the signaling control layer.

4. The communication apparatus of claim 2, wherein said name mapping unit includes a memory unit for storing signaling association attributes locally in the communication apparatus.

5. The communication apparatus of claim 1, wherein said destination is a transport address.

6. The communication apparatus of claim 5, wherein said name mapping unit includes a mapping data interface unit for distributing and/or receiving transport address attributes via the signaling control layer.

7. The communication apparatus of claim 5, wherein said name mapping unit includes a memory unit for storing transport address attributes locally in the communication apparatus.

8. The communication apparatus of claim 5, wherein said transport address is an IP address.

9. The communication apparatus of claim 1, wherein said name mapping unit is implemented in the second protocol implementation unit.

10. A communication apparatus running a protocol stack implementation for interworking between a signaling source node and a signaling target node, comprising:
    a first protocol implementation unit for running a signaling control layer of the protocol stack on top of a packet transfer network for exchange of signaling data via at least one destination;
    a second protocol implementation unit for running a user adaptation layer of the protocol stack on top of said signaling control layer for support of signaling connection control services used by the signaling source node; and
    a name mapping unit for receiving a signaling target node name from the signaling source node and for mapping the signaling target node name into a signaling target, said mapping unit further comprising a target node name resolution unit for mapping the signaling target into the destination according to a specified algorithm;
    wherein when mapping the signaling target node name into the destination, the target node name resolution unit considers at least one criterion selected from a group consisting of target node capability, target node load, and routing criteria association attributes.

11. The communication apparatus of claim 10, wherein said destination is a peer signaling association.

12. The communication apparatus of claim 10, wherein said destination is a transport address.

13. The communication apparatus of claim 10, wherein said target node name resolution unit is of a client/server type responding to name translation requests from signaling source node clients in a local and/or remote manner.

14. A communication apparatus running a protocol stack implementation for interworking between a signaling source node and a signaling target node, comprising:
    a first protocol implementation unit for running a signaling control layer of the protocol stack on top of a packet transfer network for exchange of signaling data via at least one destination;
    a second protocol implementation unit for running a user adaptation layer of the protocol stack on top of said signaling control layer for support of signaling connection control services used by the signaling source node, wherein the user adaptation layer is selected from a group consisting of:
        a signaling connection control part (SCCP) user adaptation layer (SUA);

a Message Transfer Part Level 3 (MTP3) user adaptation layer (M3UA) according to Signaling Transport (SIGTRAN) protocol stacks;
an ISDN user adaptation layer (IUA); and
a V5.2 user adaptation layer; and
a name mapping unit for receiving a signaling target node name from the signaling source node and for mapping the signaling target node name into a destination, said name mapping unit further comprising a fault management unit for detecting an inoperative destination and for selecting another destination under the same signaling target node name.

15. The communication apparatus of claim 14, wherein said destination is a peer signaling association and said fault management unit includes means for detecting an inoperative peer signaling association and/or an inoperative signaling transport address in a peer signaling association and for selecting another signaling transport address under the same signaling target node name.

16. The communication apparatus of claim 14, wherein said destination is a transport address and said fault management unit includes means for detecting an inoperative transport address and for selecting another transport address under the same signaling target node name.

17. A method of running a protocol stack implementation for interworking between a signaling source node and a signaling target node, said method comprising:
running a signaling control layer of the protocol stack on top of a packet transfer network for exchange of signaling data via at least one destination;
running a user adaptation layer of the protocol stack on top of said signaling control layer for support of signaling connection control services used by the signaling source node; and
receiving a signaling target node name from the signaling source node and mapping said signaling target node name into a destination.

18. The method of claim 17, wherein said destination is a peer signaling association.

19. The method of claim 18, further comprising checking an availability of the peer signaling association and triggering a build-up thereof.

20. The method of claim 18, further comprising storing signaling association attributes locally at the signaling source node.

21. The method of claim 17, wherein said destination is a transport address.

22. The method of claim 21 further comprising storing transport address attributes locally at the signaling source node.

23. The method of claim 21, wherein said transport address is an IP address.

24. The method of claim 17, further comprising distributing and/or receiving destinations via the signaling control layer.

25. The method of claim 17, wherein the user adaptation layer is selected from a group consisting of:
a signaling connection control part (SCCP) user adaptation layer (SUA);
a Message Transfer Part Level 3 (MTP3) user adaptation layer (M3UA) according to Signaling Transport (SIGTRAN) protocol stacks;
an ISDN user adaptation layer (IUA); and
a V5.2 user adaptation layer.

26. A method of running a protocol stack implementation for interworking between a signaling source node and a signaling target node, said method comprising:
running a signaling control layer of the protocol stack on top of a packet transfer network for exchanging signaling data via at least one destination;
running a user adaptation layer of the protocol stack on top of the signaling control layer for supporting signaling connection control services used by the signaling source node;
receiving a signaling target node name from the signaling source node; and
mapping the signaling target node name into a destination said mapping step being carried out according to a specified algorithm.

27. The method of claim 26, wherein said destination is a peer signaling association.

28. The method of claim 26, wherein said destination is a transport address.

29. The method of claim 26, wherein said specified algorithm is a query responsive database algorithm.

30. The method of claim 26, wherein said specified algorithm is a table lookup algorithm.

31. A method of running a protocol stack implementation for interworking between a signaling source node and a signaling target node, said method comprising:
running a signaling control layer of the protocol stack on top of a packet transfer network for exchanging signaling data via at least one destination;
running a user adaptation layer of the protocol stack on top of the signaling control layer for supporting signaling connection control services used by the signaling source node;
receiving a signaling target node name from the signaling source node; and
mapping said signaling target node name into a destination, said mapping step including considering at least one criterion selected from a group consisting of target node capability, target node load, and routing criteria destination attributes.

32. The method of claim 31, wherein said destination is a peer signaling association.

33. The method of claim 31, wherein said destination is a transport address.

34. A method of running a protocol stack implementation for interworking between a signaling source node and a signaling target node, said method comprising:
running a signaling control layer of the protocol stack on top of a packet transfer network for exchanging signaling data via at least one destination;
running a user adaptation layer of the protocol stack on top of said signaling control layer for supporting signaling connection control services used by the signaling source node;
receiving a signaling target node name from the signaling source node and mapping said signaling target node name into a destination; and
detecting an unreachable destination and selecting another destination under the same signaling target node name.

35. The method of claim 34, wherein said destination is a peer signaling association.

36. The method of claim 35, wherein the step of detecting an unreachable destination relates to an unreachable peer signaling association and/or an unreachable signaling transport address in a peer signaling association and the step of selecting another destination under the same signaling target node name relates to selecting another peer signaling association under said same signaling target node name.

37. The method of claim 34, wherein said destination is a transport address.

38. The method of claim 37, wherein the step of detecting an unreachable destination relates to an unreachable transport address and the step of selecting another destination under the same signaling target node name relates to selecting another transport address under said same signaling target node name.

39. A method of running a protocol stack implementation for interworking between a signaling source node and a signaling target nodes, said method comprising:
running a signaling control layer of the protocol stack on top of a packet transfer network for exchanging signaling data via at least one destination;
running a user adaptation layer of the protocol stack on top of the signaling control layer for supporting signaling connection control services used by the signaling source node;
receiving a signaling target node name from the signaling source node and mapping said signaling target node name into a destination; and
maintaining a data base storing name spaces in relation to destinations and related attributes.

40. The method of claim 39, wherein said destination is a peer signaling association.

41. The method of claim 40, wherein said destination is a transport address.

42. The method of claim 39, wherein the step of maintaining the database includes at least one step selected from a group consisting of signaling node registration, mapping node registration, signaling node deregistration, mapping node deregistration, and signaling node routing policy change registration.

43. A communication apparatus running a protocol stack implementation for interworking between a signaling source node and a signaling target node, comprising:
a first protocol implementation unit for running a signaling control layer of the protocol stack on top of a packet transfer network for exchanging signaling data via at least one signaling association;
a second protocol implementation unit for running a user adaptation layer of the protocol stack on top of said signaling control layer for supporting signaling connection control services used by the signaling source node; and
a name mapping unit for receiving a signaling target node name from the signaling source node and for mapping the signaling target node name into a peer signaling association.

44. The communication apparatus of claim 43, wherein said name mapping unit is implemented in the second protocol implementation unit.

45. The communication apparatus of claim 43, wherein said name mapping unit comprises a mapping data interface unit for distributing and/or receiving signaling association attributes via the signaling control layer.

46. The communication apparatus of claim 43, wherein said name mapping unit comprises a memory unit for storing signaling association attributes locally in the communication apparatus.

47. A communication apparatus running a protocol stack implementation for interworking between a signaling source node and a signaling target node, comprising:
a first protocol implementation unit for running a signaling control layer (SCTP) of the protocol stack on top of a packet transfer network (IP) for exchanging signaling data via at least one signaling association;
a second protocol implementation unit for running a user adaptation layer of the protocol stack on top of said signaling control layer for supporting signaling connection control services used by the signaling source node; and
a name mapping unit for receiving a signaling target node name from the signaling source node and for mapping the signaling target node name into a peer signaling association, said mapping unit including a target node name resolution unit for mapping a destination name into the peer signaling association according to a specified algorithm, wherein the target node name resolution unit is a client/server type responding to name translation requests from signaling source node clients in a local and/or remote manner.

48. The communication apparatus of claim 47, wherein when mapping the destination name into the peer signaling association, the target node name resolution unit considers at least one criterion selected from a group consisting of target node capability, target node load, and routing criteria association attributes.

49. A communication apparatus running a protocol stack implementation for interworking between a signaling source node and a signaling target node, comprising:
a first protocol implementation unit for running a signaling control layer of the protocol stack on top of a packet transfer network for exchanging signaling data via at least one signaling association;
a second protocol implementation unit for running a user adaptation layer of the protocol stack on top of said signaling control layer for supporting signaling connection control services used by the signaling source node; and
a name mapping unit for receiving a signaling target node name from the signaling source node and for mapping the signaling target node name into a peer signaling association, said name mapping unit including a fault management unit for detecting an inoperative peer signaling association and/or an inoperative signaling transport address in a peer signaling association and for selecting another signaling transport address under the same signaling target node name.

50. A method of running a protocol stack implementation for interworking between a signaling source node and a signaling target node, said method comprising:
running a signaling control layer of the protocol stack on top of a packet transfer network for exchanging signaling data via at least one signaling association;
running a user adaptation layer of the protocol stack on top of the signaling control layer for supporting signaling connection control services used by the signaling source node;
receiving a signaling target node name from the signaling source node; and
mapping the signaling target node name into a peer signaling association.

51. The method of claim 50, further comprising checking an availability of the peer signaling association and triggering a build-up thereof.

52. The method of claim 50, further comprising distributing and/or receiving signaling association attributes via the signaling control layer.

53. The method of claim 50, further comprising storing signaling association attributes locally at the signaling source node.

54. A method of running a protocol stack implementation for interworking between a signaling source node and a signaling target node, said method comprising:
- running a signaling control layer of the protocol stack on top of a packet transfer network for exchanging signaling data via at least one signaling association;
- running a user adaptation layer of the protocol stack on top of the signaling control layer for supporting signaling connection control services used by the signaling source node;
- receiving a signaling target node name from the signaling source node; and
- mapping the signaling target node name into a peer signaling association said mapping step being carried out according to a specified algorithm.

55. The method of claim 54, wherein said specified algorithm is a query responsive database algorithm.

56. The method of claim 54, wherein said specified algorithm is a table lookup algorithm.

57. A method of running a protocol stack implementation for interworking between a signaling source node and a signaling target node, said method comprising:
- running a signaling control layer of the protocol stack on top of a packet transfer network for exchanging signaling data via at least one signaling association;
- running a user adaptation layer of the protocol stack on top of the signaling control layer for supporting signaling connection control services used by the signaling source node;
- receiving a signaling target node name from the signaling source node; and
- mapping the signaling target node name into a peer signaling association, said mapping step including considering at least one criterion selected from a group consisting of target node capability, target node load, and routing criteria association attributes.

58. A method of running a protocol stack implementation for interworking between a signaling source node and a signaling target node, said method comprising:
- running a signaling control layer of the protocol stack on top of a packet transfer network for exchanging signaling data via at least one signaling association;
- running a user adaptation layer of the protocol stack on top of the signaling control layer for supporting signaling connection control services used by the signaling source node;
- receiving a signaling target node name from the signaling source node;
- mapping the signaling target node name into a peer signaling association;
- detecting an unreachable peer signaling association and/or an unreachable signaling transport address in a peer signaling association; and
- selecting another signaling transport address under the same signaling target node name.

59. A method of running a protocol stack implementation for interworking between a signaling source node and a signaling target node, said method comprising:
- running a signaling control layer of the protocol stack on top of a packet transfer network for exchanging signaling data via at least one signaling association;
- running a user adaptation layer of the protocol stack on top of the signaling control layer for supporting signaling connection control services used by the signaling source node;
- receiving a signaling target node name from the signaling source node;
- mapping the signaling target node name into a peer signaling association; and
- maintaining a data base storing name spaces and/or association attributes.

60. The method of claim 59, wherein the step of maintaining the data base includes at least one step selected from a group consisting of signaling node registration, mapping node registration, signaling node deregistration. mapping node deregistration, and signaling node routing policy change registration.

61. A computer program product directly loadable into the internal memory of a communication device, wherein, when the product is run on a processor of the communication device, the device performs the steps of:
- running a signaling control layer of the protocol stack on top of a packet transfer network for exchanging signaling data via at least one signaling association;
- running a user adaptation layer of the protocol stack on top of the signaling control layer for supporting signaling connection control services used by the signaling source node;
- receiving a signaling target node name from the signaling source node; and
- mapping the signaling target node name into a peer signaling association.

* * * * *

UNITED STATES PATENT AND TRADEMARK OFFICE
CERTIFICATE OF CORRECTION

PATENT NO. : 7,164,693 B2  
APPLICATION NO. : 10/023599  
DATED : January 16, 2007  
INVENTOR(S) : Turina et al.

It is certified that error appears in the above-identified patent and that said Letters Patent is hereby corrected as shown below:

In Column 1, Line 18, delete "sack" and insert -- stack --, therefor.

In Column 2, Line 34, delete "or" and insert -- on --, therefor.

In Column 3, Line 31, delete "she" and insert -- the --, therefor.

In Column 3, Line 40, delete "he" and insert -- the --, therefor.

In Column 4, Line 37, delete "sane" and insert -- same --, therefor.

In Column 6, Line 22, delete "mare" and insert -- more --, therefor.

In Column 6, Line 66, delete "or" and insert -- of --, therefor.

In Column 8, Line 18, delete "rapping" and insert -- mapping --, therefor.

In Column 8, Line 67, delete "nay" and insert -- may --, therefor.

In Column 11, Line 16, delete "IF" and insert -- IP --, therefor.

In Column 11, Line 40, delete "or" and insert -- of --, therefor.

In Column 13, Line 25, delete "she" and insert -- the --, therefor.

In Column 13, Line 30, delete "or" and insert -- of --, therefor.

Signed and Sealed this

Thirty-first Day of March, 2009

JOHN DOLL  
*Acting Director of the United States Patent and Trademark Office*